United States Patent
Qiu et al.

(10) Patent No.: US 10,523,063 B2
(45) Date of Patent: Dec. 31, 2019

(54) COMMON MODE NOISE COMPENSATION IN WIRELESS POWER SYSTEMS

(71) Applicant: Apple Inc., Cupertino, CA (US)

(72) Inventors: Weihong Qiu, San Ramon, CA (US); Rohan Dayal, Daly City, CA (US); Zaki Moussaoui, San Carlos, CA (US)

(73) Assignee: APPLE INC., Cupertino, CA (US)

(*) Notice: Subject to any disclaimer, the term of this patent is extended or adjusted under 35 U.S.C. 154(b) by 148 days.

(21) Appl. No.: 15/829,850

(22) Filed: Dec. 1, 2017

(65) Prior Publication Data

US 2018/0294682 A1    Oct. 11, 2018

Related U.S. Application Data

(60) Provisional application No. 62/483,232, filed on Apr. 7, 2017.

(51) Int. Cl.
| | | |
|---|---|---|
| *H02J 50/70* | (2016.01) | |
| *H02J 50/12* | (2016.01) | |
| *H02J 7/02* | (2016.01) | |

(52) U.S. Cl.
CPC .............. *H02J 50/70* (2016.02); *H02J 50/12* (2016.02); *H02J 7/025* (2013.01)

(58) Field of Classification Search
CPC .................................. H02J 50/70; H02J 50/12
See application file for complete search history.

(56) References Cited

U.S. PATENT DOCUMENTS

| | | |
|---|---|---|
| 4,268,899 A | 5/1981 | Rokas |
| 5,293,308 A | 3/1994 | Boys et al. |
| 5,479,486 A | 12/1995 | Saji |
| 5,639,989 A | 6/1997 | Higgins, III |
| 6,198,260 B1 | 3/2001 | Wittenbreder |
| 6,960,968 B2 | 11/2005 | Odenaal et al. |
| 6,972,543 B1 | 12/2005 | Wells |
| 7,218,534 B2 | 5/2007 | Yasumura |
| 7,339,558 B2 | 3/2008 | Chen et al. |

(Continued)

FOREIGN PATENT DOCUMENTS

| | | |
|---|---|---|
| CN | 1826715 | 8/2006 |
| CN | 101243374 | 8/2006 |

(Continued)

OTHER PUBLICATIONS

U.S. Appl. No. 15/829,610, filed Dec. 1, 2017, Qiu et al.

(Continued)

*Primary Examiner* — Jared Fureman
*Assistant Examiner* — Duc M Pham
(74) *Attorney, Agent, or Firm* — Brownstein Hyatt Farber Schreck, LLP

(57) ABSTRACT

Disclosed are devices, systems, and methods for reducing common mode noise induced in wireless charging circuits of electronic devices. For an electronic device having an inductive receiving coil near an electric shielding layer, differences in parasitic capacitances of the loops of the inductive receiving coil with an electric shielding layer can induce common mode noise. Common mode noise is reduced by a noise-reduction capacitor from the inductive receiving coil to the electric shielding layer together with a grounding resistor from the electric shielding layer to a common ground of the wireless charging circuit.

20 Claims, 8 Drawing Sheets

(56) References Cited

U.S. PATENT DOCUMENTS

| | | |
|---|---|---|
| 7,641,358 B1 | 1/2010 | Smith et al. |
| 7,893,564 B2 | 2/2011 | Bennett |
| 7,948,208 B2 | 5/2011 | Partovi et al. |
| 7,952,322 B2 | 5/2011 | Partovi et al. |
| 8,024,491 B1 | 9/2011 | Wright et al. |
| 8,054,651 B2 | 11/2011 | Pollard |
| 8,134,416 B2 | 3/2012 | Moiraghi et al. |
| 8,169,151 B2 | 5/2012 | Kimura |
| 8,169,185 B2 | 5/2012 | Partovi et al. |
| 8,274,178 B2 | 9/2012 | Tucker |
| 8,278,784 B2 | 10/2012 | Cook |
| 8,329,376 B2 | 11/2012 | Kitamura et al. |
| 8,332,547 B2 | 12/2012 | Sugaya |
| 8,362,744 B2 | 1/2013 | Terao et al. |
| 8,415,834 B2 | 4/2013 | Suzuki et al. |
| 8,421,274 B2 | 4/2013 | Son et al. |
| 8,446,046 B2 | 5/2013 | Fells et al. |
| 8,461,817 B2 | 6/2013 | Martin et al. |
| 8,482,250 B2 | 7/2013 | Soar |
| 8,498,136 B2 | 7/2013 | Shinomoto et al. |
| 8,629,652 B2 | 1/2014 | Partovi et al. |
| 8,629,654 B2 | 1/2014 | Partovi et al. |
| 8,663,106 B2 | 3/2014 | Stivoric |
| 8,716,974 B2 | 5/2014 | Sakoda et al. |
| 8,729,852 B2 | 5/2014 | Tsai et al. |
| 8,742,625 B2 | 6/2014 | Baarman et al. |
| 8,810,071 B2 | 8/2014 | Sauerlaender et al. |
| 8,853,892 B2 | 10/2014 | Fells et al. |
| 8,884,469 B2 | 11/2014 | Lemmens |
| 8,890,470 B2 | 11/2014 | Partovi et al. |
| 8,896,264 B2 | 11/2014 | Partovi |
| 8,901,881 B2 | 12/2014 | Partovi et al. |
| 8,922,525 B2 | 12/2014 | Chen et al. |
| 8,947,047 B2 | 2/2015 | Partovi et al. |
| 9,018,904 B2 | 4/2015 | Seyerle et al. |
| 9,030,421 B2 | 5/2015 | Tseng et al. |
| 9,041,346 B2 | 5/2015 | Nakama |
| 9,048,682 B2 | 6/2015 | Lee et al. |
| 9,057,753 B2 | 6/2015 | Nakano et al. |
| 9,093,857 B2 | 7/2015 | Sakai et al. |
| 9,099,867 B2 | 8/2015 | Park |
| 9,099,885 B2 | 8/2015 | Kamata |
| 9,106,083 B2 | 8/2015 | Partovi |
| 9,112,362 B2 | 8/2015 | Partovi |
| 9,112,363 B2 | 8/2015 | Partovi |
| 9,112,364 B2 | 8/2015 | Partovi |
| 9,124,112 B2 | 9/2015 | Havass et al. |
| 9,126,490 B2 | 9/2015 | Cook |
| 9,148,201 B2 | 9/2015 | Kallal et al. |
| 9,154,189 B2 | 10/2015 | Von Novak et al. |
| 9,160,180 B2 | 10/2015 | Suzuki et al. |
| 9,178,369 B2 | 11/2015 | Partovi |
| 9,197,065 B2 | 11/2015 | Divan et al. |
| 9,197,070 B2 | 11/2015 | Jung |
| 9,197,082 B1 | 11/2015 | Zhang |
| 9,231,411 B2 | 1/2016 | Baarman et al. |
| 9,270,138 B2 | 2/2016 | Yamakawa et al. |
| 9,276,437 B2 | 3/2016 | Partovi et al. |
| 9,318,915 B2 | 4/2016 | Miller et al. |
| 9,325,200 B2 | 4/2016 | Nishiwaki |
| 9,352,661 B2 | 5/2016 | Keeling et al. |
| 9,356,659 B2 | 5/2016 | Partovi |
| 9,376,027 B2 | 6/2016 | Harris |
| 9,407,107 B2 | 8/2016 | Park et al. |
| 9,410,823 B2 | 8/2016 | Widmer et al. |
| 9,444,266 B2 | 9/2016 | Van Wageningen et al. |
| 9,460,846 B2 | 10/2016 | Graham et al. |
| 9,461,501 B2 | 10/2016 | Partovi et al. |
| 9,461,502 B2 | 10/2016 | Lee |
| 9,496,731 B2 | 11/2016 | Park et al. |
| 9,496,732 B2 | 11/2016 | Partovi et al. |
| 9,507,447 B2 | 11/2016 | Yilmaz |
| 9,509,374 B2 | 11/2016 | Kim et al. |
| 9,515,514 B2 | 12/2016 | Lee et al. |
| 9,531,300 B2 | 12/2016 | Harrison et al. |
| 9,537,353 B1 | 1/2017 | Bossetti et al. |
| 9,553,485 B2 | 1/2017 | Singh et al. |
| 9,564,776 B2 | 2/2017 | Lampinen |
| 9,577,440 B2 | 2/2017 | Partovi et al. |
| 9,627,913 B2 | 4/2017 | Maugars |
| 9,685,802 B1 | 6/2017 | Mirov |
| 9,685,814 B1 | 6/2017 | Moyer et al. |
| 9,698,761 B2 | 7/2017 | Waffenschmidt et al. |
| 9,716,433 B2 | 7/2017 | Coleman et al. |
| 9,722,447 B2 | 8/2017 | Partovi |
| 9,754,717 B2 | 9/2017 | Long et al. |
| 9,755,534 B2 | 9/2017 | Mao |
| 9,760,195 B2 * | 9/2017 | Krah ............... G06F 3/0412 |
| 9,768,643 B2 | 9/2017 | Kanno et al. |
| 9,793,761 B2 | 10/2017 | Sampei et al. |
| 9,800,076 B2 | 10/2017 | Jadidian et al. |
| 9,811,204 B2 | 11/2017 | Sauer et al. |
| 9,813,041 B1 | 11/2017 | Ritter |
| 9,831,787 B1 | 11/2017 | Halberstadt |
| 9,958,904 B2 | 5/2018 | von Badinski et al. |
| 10,027,130 B2 | 7/2018 | Cho et al. |
| 10,027,185 B2 | 7/2018 | Moyer |
| 10,032,557 B1 | 7/2018 | Bossetti |
| 10,116,169 B2 | 10/2018 | Cho et al. |
| 2001/0044588 A1 | 11/2001 | Mault |
| 2008/0174268 A1 | 7/2008 | Koo et al. |
| 2008/0284609 A1 | 11/2008 | Rofougaran |
| 2009/0146608 A1 | 6/2009 | Lee |
| 2010/0201315 A1 | 8/2010 | Oshimi et al. |
| 2010/0328044 A1 | 12/2010 | Waffenschmidt et al. |
| 2011/0050164 A1 | 3/2011 | Partovi et al. |
| 2011/0109264 A1 | 5/2011 | Choi |
| 2011/0198937 A1 | 8/2011 | Tseng |
| 2011/0221387 A1 | 9/2011 | Steigerwald et al. |
| 2011/0234012 A1 | 9/2011 | Yi et al. |
| 2011/0241615 A1 | 10/2011 | Yeh |
| 2011/0254379 A1 | 10/2011 | Madawala |
| 2011/0302078 A1 | 12/2011 | Failing |
| 2012/0068550 A1 | 3/2012 | De Boer et al. |
| 2012/0169139 A1 | 7/2012 | Kudo |
| 2012/0255039 A1 | 10/2012 | Sipes |
| 2012/0313577 A1 | 12/2012 | Moes et al. |
| 2013/0093388 A1 | 4/2013 | Partovi |
| 2013/0099563 A1 | 4/2013 | Partovi et al. |
| 2013/0101127 A1 | 4/2013 | Buchmann |
| 2013/0214909 A1 | 8/2013 | Meijers et al. |
| 2013/0260677 A1 | 10/2013 | Partovi |
| 2013/0271069 A1 | 10/2013 | Partovi |
| 2013/0285605 A1 | 10/2013 | Partovi |
| 2013/0300204 A1 | 11/2013 | Partovi |
| 2013/0334326 A1 | 12/2013 | Shan |
| 2014/0015327 A1 | 1/2014 | Keeling et al. |
| 2014/0035378 A1 | 2/2014 | Kesler et al. |
| 2014/0129010 A1 | 5/2014 | Garg |
| 2014/0159656 A1 | 6/2014 | Riehl |
| 2014/0191568 A1 | 7/2014 | Partovi |
| 2014/0197687 A1 | 7/2014 | Lin |
| 2014/0197782 A1 | 7/2014 | Graf et al. |
| 2014/0266018 A1 | 9/2014 | Carobolante |
| 2014/0306654 A1 | 10/2014 | Partovi |
| 2014/0347007 A1 | 11/2014 | Kee et al. |
| 2015/0001950 A1 | 1/2015 | Chung et al. |
| 2015/0009727 A1 * | 1/2015 | Zhou ............... H02M 1/44 363/40 |
| 2015/0022194 A1 | 1/2015 | Almalki |
| 2015/0035372 A1 | 2/2015 | Aioanei |
| 2015/0280455 A1 | 3/2015 | Bosshard et al. |
| 2015/0130412 A1 | 5/2015 | Partovi |
| 2015/0207333 A1 | 7/2015 | Baarman et al. |
| 2015/0214750 A1 | 7/2015 | Moshkovich et al. |
| 2015/0215006 A1 | 7/2015 | Mehas et al. |
| 2015/0244179 A1 | 8/2015 | Ritter et al. |
| 2015/0244341 A1 | 8/2015 | Ritter et al. |
| 2015/0270058 A1 | 9/2015 | Golko et al. |
| 2015/0333530 A1 | 11/2015 | Moyer et al. |
| 2015/0349538 A1 | 12/2015 | Agostinelli et al. |
| 2015/0364931 A1 | 12/2015 | Ren et al. |
| 2016/0043567 A1 | 2/2016 | Matumoto et al. |
| 2016/0049796 A1 | 2/2016 | Cho et al. |

(56) References Cited

U.S. PATENT DOCUMENTS

| | | |
|---|---|---|
| 2016/0056664 A1 | 2/2016 | Partovi |
| 2016/0064948 A1 | 3/2016 | Heresztyn et al. |
| 2016/0064992 A1 | 3/2016 | Herbst et al. |
| 2016/0072306 A1 | 3/2016 | Tsuda |
| 2016/0127672 A1 | 5/2016 | Kamide et al. |
| 2016/0172894 A1 | 6/2016 | Khripkov et al. |
| 2016/0181849 A1 | 6/2016 | Govindaraj |
| 2016/0261137 A1 | 9/2016 | Riehl |
| 2016/0285278 A1 | 9/2016 | Mehas et al. |
| 2017/0012463 A1 | 1/2017 | Lynch |
| 2017/0089959 A1 | 3/2017 | Ito et al. |
| 2017/0110911 A1 | 4/2017 | Bossetti et al. |
| 2017/0222493 A1 | 8/2017 | Oki et al. |
| 2018/0013312 A1 | 1/2018 | Moyer et al. |
| 2018/0062443 A1* | 3/2018 | Cho .................. H02J 50/12 |
| 2018/0233955 A1 | 8/2018 | Park et al. |
| 2018/0294742 A1 | 10/2018 | Qiu et al. |
| 2019/0006892 A1 | 1/2019 | Heresztyn et al. |
| 2019/0020213 A1 | 1/2019 | Moyer et al. |

FOREIGN PATENT DOCUMENTS

| | | |
|---|---|---|
| CN | 101232190 | 7/2008 |
| CN | 101777801 | 7/2010 |
| CN | 101814757 | 8/2010 |
| CN | 102055250 | 5/2011 |
| CN | 102113195 | 6/2011 |
| CN | 102124624 | 7/2011 |
| CN | 102257696 | 11/2011 |
| CN | 102355035 | 2/2012 |
| CN | 102396132 | 3/2012 |
| CN | 202712982 | 1/2013 |
| CN | 102998711 | 3/2013 |
| CN | 103019485 | 4/2013 |
| CN | 202976038 | 6/2013 |
| CN | 103248132 | 8/2013 |
| CN | 103269092 | 8/2013 |
| CN | 103324333 | 9/2013 |
| CN | 103326475 | 9/2013 |
| CN | 103457362 | 12/2013 |
| CN | 103518175 | 1/2014 |
| CN | 103545893 | 1/2014 |
| CN | 103597711 | 2/2014 |
| CN | 103765722 | 4/2014 |
| CN | 103812162 | 5/2014 |
| CN | 103999320 | 8/2014 |
| CN | 104037750 | 9/2014 |
| EP | 1633122 | 8/2005 |
| EP | 2642628 | 9/2013 |
| GB | 2484999 | 5/2012 |
| JP | H06311658 | 4/1994 |
| JP | H06268565 | 9/1994 |
| JP | H08149608 | 6/1996 |
| JP | H08331850 | 12/1996 |
| JP | H10173741 | 6/1998 |
| JP | 2001069388 | 3/2001 |
| JP | 2001333551 | 11/2001 |
| JP | 2010161882 | 7/2010 |
| JP | 2010268531 | 11/2010 |
| JP | 2011120443 | 6/2011 |
| JP | 2011259612 | 12/2011 |
| JP | 2012503959 | 2/2012 |
| JP | 2013115929 | 6/2013 |
| JP | 2013183497 | 9/2013 |
| JP | 2013536664 | 9/2013 |
| JP | 2014023281 | 3/2014 |
| JP | 2014193087 | 10/2014 |
| KR | 1020070023337 | 2/2007 |
| KR | 1020120097155 | 9/2012 |
| KR | 20130055199 | 5/2013 |
| KR | 20140061337 | 5/2014 |
| WO | WO 09/045847 | 4/2009 |
| WO | WO 10/077991 | 7/2010 |
| WO | WO 10/108191 | 9/2010 |
| WO | WO 11/156555 | 12/2011 |
| WO | WO 12/085119 | 6/2012 |
| WO | WO 13/011905 | 1/2013 |
| WO | WO 13/122625 | 8/2013 |
| WO | WO 14/034966 | 3/2014 |
| WO | WO 15/102113 | 7/2015 |
| WO | WO 16/024869 | 2/2016 |

OTHER PUBLICATIONS

U.S. Appl. No. 16/025,828, filed Jul. 2, 2018, Heresztyn et al.
U.S. Appl. No. 16/133,195, filed Sep. 17, 2018, Moyer et al.
U.S. Appl. No. 15/468,001, filed Mar. 23, 2017, Bentov et al.
U.S. Appl. No. 15/468,001, filed Mar. 23, 2017, Qiu et al.
U.S. Appl. No. 15/626,930, filed Jun. 19, 2017, Moyer et al.

* cited by examiner

COMMON MODE NOISE COMPENSATION IN WIRELESS POWER SYSTEMS

CROSS-REFERENCE TO RELATED APPLICATION(S)

This application is a nonprovisional patent application of, and claims the benefit to, U.S. Provisional Patent Application No. 62/483,232, filed Apr. 7, 2017 and titled "Common Mode Noise Compensation in Wireless Power Systems," the disclosure of which is hereby incorporated herein in its entirety.

FIELD

Embodiments described herein generally relate to wireless power systems and, in particular, to a receiver of a wireless power system configured to reduce or eliminate common mode noise introduced to the receiver by operation of a transmitter coupled to the receiver.

BACKGROUND

An electronic device can recharge an internal battery by wirelessly coupling to a power converter that is connected to a power source. Collectively, the electronic device and power converter be referred to as a wireless power system that transfers power from the power source to the internal battery.

A conventional wireless power system includes a transmit coil that magnetically couples to a receive coil within the electronic device to deliver power by electromagnetic induction.

SUMMARY

A conventional wireless power system introduces common mode noise to the electronic device—via capacitive coupling—during power transfer. Common mode noise can affect voltage-sensitive systems within the mobile device, such as capacitive user input systems, capacitive fingerprint systems, capacitive proximity sensors, and so on.

Embodiments described herein generally reference devices, systems, and methods for reducing noise—such as common mode noise—introduced as a result of operating a wireless power transfer system.

For example, one embodiment described herein references an electronic device including a receive coil. The receive coil includes an electrode that couples to additional circuit elements enclosed in a housing of the electronic device, such as a battery charging circuit. The electronic device also includes an electric shielding layer positioned between the housing and the receive coil to mitigate capacitive coupling between the receive coil and conductors external to the electronic device.

A noise-reduction capacitor couples receive coil (e.g., at the electrode) to the electric shielding layer. A grounding resistor connects the electric shielding layer to a common ground of the electronic device, thereby defining a discharge path from the electric shielding layer to common ground. In this manner, the noise-reduction capacitor balances stray capacitances (e.g., between inner and outer sections of the receive coil) that may develop between the receive coil and the electric shielding layer.

In some embodiments, the electronic device also includes one or more resonant capacitors in series with the receive coil. In these embodiments, the noise-reduction capacitor can be connected on either side of one (or both) resonant capacitors.

Other embodiments reference a method for reducing noise in wireless charging circuitry of an electronic device. The method includes the operations of shielding the wireless charging circuitry with an electric shielding layer between the wireless charging circuitry and an exterior surface of the electronic device. The method also includes the operation of connecting a resistor from the electric shielding layer to a common ground of the electronic device. The method also includes the operation of coupling a noise-reduction capacitor between an electrode of the receive coil and the electric shielding layer of the electronic device.

Other embodiments described herein reference a wireless power transfer system. The system includes a power transmitter (or, more generally, a "transmitter) having a transmit coil and a transmit-side electric shielding layer positioned between the transmit coil and an exterior surface of the enclosure of the transmitter. The system also includes a power receiver (or, more generally, "receiver") of an electronic device that includes a receive coil and a receive-side electric shielding layer. The receive-side electric shielding layer is positioned between the housing of the device and the receive coil. A noise-reduction capacitor couples an electrode of the receive coil to the receive-side electric shielding layer. A grounding resistor is connected from the receive-side electric shielding layer to a common ground of the electronic device.

BRIEF DESCRIPTION OF THE DRAWINGS

The disclosure will be readily understood by the following detailed description in conjunction with the accompanying drawings, wherein like reference numerals designate like structural elements.

Figure 1A:
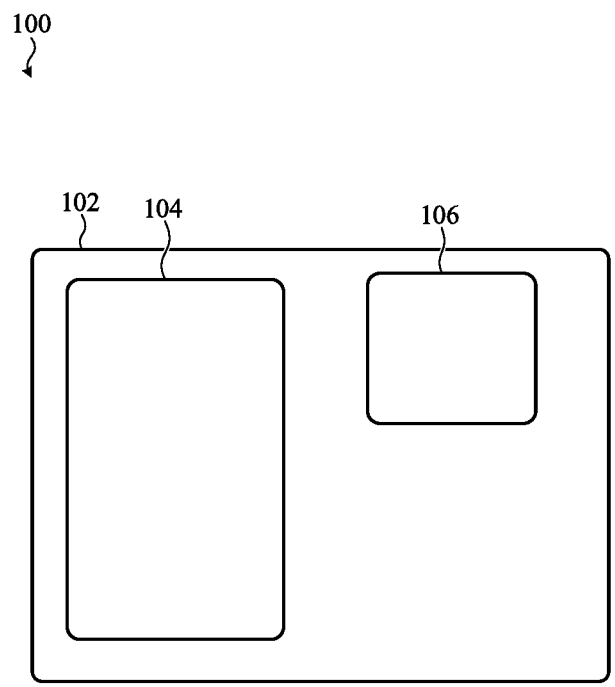
FIG. 1A illustrates a wireless power transfer system such as described herein.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

A wireless power system typically includes a transmitter device and a receiver device. A transmit coil in the transmitter device magnetically couples to a receive coil in the receiver device to transfer electrical power to the receiver by electromagnetic induction. For simplicity of description, a transmitter device is referred to herein as simply a "transmitter" and a receiver device is referred to herein as simply a "receiver."

In a conventional wireless power transfer system, a transmit coil is defined by a number turns that follow a path from an outer radius to an inner radius. As alternating electric current moves through the transmit coil, progressive impedance through the coil results in a voltage gradient from the outer radius to the inner radius that varies with current. The varying voltage gradient results in a varying electric field that influences reference voltage levels (e.g., ground plane, supply lines, signal lines, and so on) in a receiver nearby the transmit coil. In other words, in a conventional wireless power transfer system, the transmit coil introduces common mode noise into the receiver via capacitive coupling.

In these conventional cases, when the receiver device is touched by a user—or otherwise electrically grounded—various reference voltage levels in the device can change by an unknown amount. This uncontrollable variability can interfere with the operation of certain systems in the receiver, such as touch input systems or capacitive sensors. More specifically, systems in the receiver that depend on differential voltage measurements can behave unpredictably when the receiver is receiving power, wirelessly, from the transmitter. For example, in the case of a capacitive touch sensor, false touch events can be registered and/or actual touch events may be rejected. Such unpredictable device behavior negatively impacts the user experience of operating the device.

Furthermore, in some cases, a conventional transmitter can include multiple transmit coils, each of which is configured to transfer power to a respective one receiver or receive coil. In these examples, a single receiver can capacitively couple to multiple transmit coils, which may or may not be in-phase with one another. In other words, the receiver can be subject to both differential mode noise and to common mode noise, each of which can lead to unexpected behavior of the receiver.

Embodiments described herein reference noise mitigation or elimination techniques for reducing electrical noise introduced to a receiver (e.g., within an electronic device) by operation of a transmitter of a wireless power transfer system. More specifically, a receive-side electric shield layer is positioned between a receive coil of a receiver and the transmit coil of a transmitter and, additionally or optionally, a transmit-side electric shield layer is positioned between the transmit coil and the receive coil. In many embodiments, the receive-side electric shield layer is coupled directly to the receive coil via a noise-reduction capacitor (e.g., a bypass capacitor or a decoupling capacitor). The receive-side electric shield layer discharges to common ground through a grounding resistor. This construction, and implementation-specific variations thereto (some examples of which are described herein), reduces effects of common mode and/or differential mode noise in the receiver device introduced by the transmit coil.

More specifically, embodiments described herein are directed to wireless power transfer systems configured to transfer power from a transmitter to a receiver, referred to herein, generally, as an "electronic device." Examples of suitable electronic devices include, but are not limited to: a cellular phone, a tablet computer, a wearable electronic device (e.g., watch, pendant, bracelet, necklace, anklet, ring, headphone, glasses, wearable display, and so on), a peripheral input device (e.g., keyboard, mouse, trackpad, remote control, stylus, gaming device, gesture input device, and so on), an authentication device or token (e.g., password token, vehicle key, and so on), an access card, an anti-theft or loss prevention device, a home automation device, a display, and so on. Furthermore, although many embodiments described herein reference low-voltage handheld electronic devices, it may be appreciated that the techniques, methods, and systems described herein may be equivalently applied to high voltage or high power systems or electronic devices.

The transmitter and the electronic device are separate devices enclosed in separate housings. The electronic device can be placed on or near the transmitter so that a receive coil within the electronic device can magnetically couple to a transmit coil in the transmitter. For simplicity of description, many embodiments that follow reference a single transmit coil coupled to a single receive coil, but it may be appreciated that this is merely one example and other implementations and constructions are possible in view of the systems and methods described herein. For example, in some cases, a transmitter can include multiple transmit coils, arranged in a pattern in one or more layers, and, additionally or alternatively, an electronic device can include multiple receive coils, arranged in any suitable manner. In some cases, more than one transmit coil can magnetically couple to a single receive coil.

These and other embodiments are discussed below in more detail with reference to FIGS. 1A-8. However, those skilled in the art will readily appreciate that the detailed description given herein with respect to these Figures is for explanatory purposes only and should not be construed as limiting.

Figure 1B:
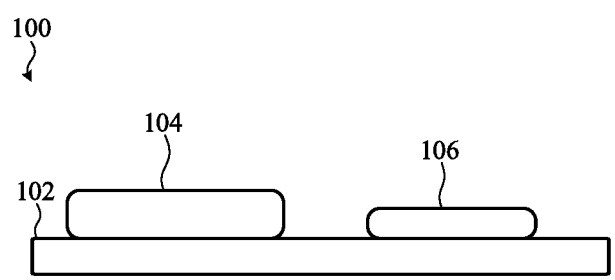
FIG. 1B illustrates a side view of the wireless power transfer system of FIG. 1A.

Generally and broadly, FIGS. 1A-1B depict a wireless power system 100 including a transmitter 102, an electronic device 104, and an electronic device 106. In particular, FIG. 1A depicts a plan view the wireless power system 100 and FIG. 1B depicts a side view of the wireless power system 100, specifically illustrating an example embodiment in which a transmitter 102 is accommodated in a low-profile (e.g., thin) enclosure. As with other embodiments described the wireless power system 100 is configured to transfer power—via inductive coupling—from the transmitter 102 to one or more mobile devices, such as the electronic device 104 or the electronic device 106.

The transmitter 102 is disposed within an enclosure. The enclosure can accommodate: one or more transmit coils or transmit coil arrays or layers, a processor, memory, display, battery, network connections, sensors, input/output ports, acoustic elements, haptic elements, digital and/or analog circuits for performing and/or coordinating tasks of the wireless power system 100, and so on. For simplicity of illustration, the enclosure is depicted in FIG. 1A without many of these elements, each of which may be included, partially and/or entirely, within the enclosure and may be operationally or functionally associated with the transmitter 102. In some embodiments, the transmitter 102 is fully-integrated; all components of the transmitter 102 are within the enclosure, apart from an electrical connection (e.g., cable) to mains voltage, which is not depicted.

Like the transmitter 102, the electronic device 104 is disposed within an enclosure. Typically, the enclosure of the electronic device 104 is smaller than the enclosure of the transmitter 102, but this may not be required. The enclosure of the electronic device 104 can accommodate: one or more receive coils, a processor, memory, display, battery, voltage-sensitive systems, capacitive or other sensors, network connections, input/output ports, acoustic elements, haptic elements, digital and/or analog circuits for performing and/or coordinating tasks of the wireless power system 100 or another electronic device, and so on. For simplicity of illustration, the enclosure of the electronic device 104 is depicted in FIG. 1A without many of these elements, each of which may be included, partially and/or entirely, within the enclosure and may be operationally or functionally associated with the electronic device 104. The electronic device 106 may include similar or identical elements.

In some examples, either or both the electronic device 104 or the electronic device 106 is a mobile electronic device such as a cellular phone, a tablet computer, a wearable electronic device (e.g., watch, pendant, bracelet, necklace, anklet, ring, headphone, glasses, wearable display, and so on), a peripheral input device (e.g., keyboard, mouse, trackpad, remote control, stylus, gaming device, gesture input device, and so on), an authentication device or token (e.g., password token, vehicle key, and so on), an access card, an anti-theft or loss prevention device, a home automation device, a display, and so on.

In the illustrated embodiment, the enclosure of transmitter 102 defines a charging surface for receiving the electronic device 104 and the electronic device 106. The charging surface can be substantially planar, although this is not required. For example, in some embodiments, the charging surface may be concave, convex, or may take another shape.

In many examples, the transmitter 102 includes multiple transmit coils distributed at different locations relative to the charging surface (see, e.g., FIG. 2A). In these embodiments, individual transmit coils can be associated with different portions of the charging surface. In this manner, the wireless power system 100 can selectively activate or deactivate transmit coils of the transmitter 102 independently.

Further, the wireless power system 100 can selectively control power output from each transmit coil by applying specific waveforms to each individual transmit coil. In many cases, the wireless power system 100 can selectively activate a transmit coil (or more than one transmit coil) based on the position and/or orientation of the electronic device 104 (or the electronic device 106) relative to the charging surface and, in particular, relative to the location of the nearest transmit coil or coils. More specifically, the wireless power system 100 can selectively activate a transmit coil based on a coupling factor that corresponds to the mutual coupling between that transmit coil and a receive coil disposed within the electronic device 104; the higher the coupling factor, the more likely the wireless power system 100 is to activate that transmit coil to effect power transfer from that transmit coil of the transmitter 102 to the receive coil within the electronic device 104.

Figure 2:
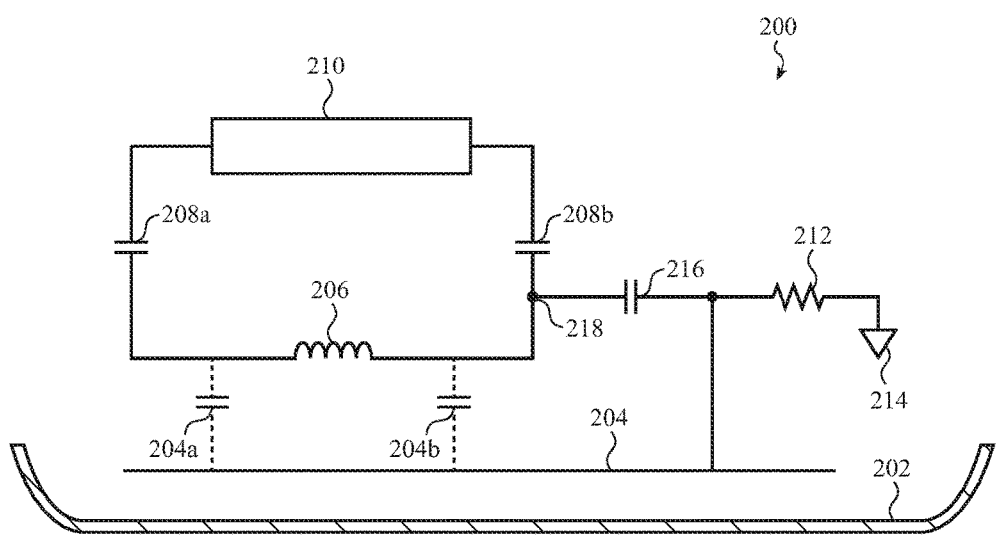
FIG. 2 illustrates a simplified partial cross section and a simplified circuit diagram of a receiver of a wireless power transfer system, such as described herein.

FIG. 2 shows a simplified circuit diagram and partial cross sectional view of circuit elements of an electronic device 200, such as may be used in electronic devices 104 and 106, according to various embodiments.

The electronic device 200 includes a housing 202, shown in part, that encloses the various electronic circuit elements shown, as well as other components such as a battery, a display screen, circuit boards, and so on, that are not shown. The electronic device 200 also includes an electric shielding layer 204 to isolate the various circuit elements and their electrical operation from electromagnetic interference originating outside the electronic device.

The electric shielding layer 204 may be implemented as a single layer of a conductive material, such as a paramagnetic metal. Suitable materials include, but may not be limited to aluminum, conductive plastics or glass, copper, or another metal or combination of metals. The electric shielding layer 204 may have patterns of holes or slots, and may be made from a single piece or layer of material or multiple sections or layers of material. In many cases, different layers or pieces of material may be electrically connected to one another. The holes or slots of certain embodiments may serve to reduce eddy currents that may be generated in the electric shielding layer 204 when in the presence of a varying magnetic field. In this manner, the electric shielding layer 204 shields the electronic device 200 from external electric fields while permitting external magnetic fields used to transfer power to the electronic device 200.

In further embodiments, the electric shielding layer 204 may be segmented; different portions of the electric shielding layer 204 (e.g., angular sections, radial sections, quadrants, and so on) may be coupled or used in different ways. For simplicity of description, a single electric shielding layer is described in reference to the embodiments that follow but it is appreciated that in certain embodiments, the electric shielding layer 204 can be configured in any suitable or implementation-specific manner.

The electronic device 200 has a wireless power receiving system (more generally, a "receiver") configured to magnetically couple to a wireless power transmitting system. The receiver may be configured to provide power to the electronic device 200. The receiver can include a receive coil 206 and one or more resonant capacitors 208a, 208b. Other circuit elements may be included in the electronic device 200, such as the load 210, and may be coupled directly or indirectly to the receive coil 206 and/or the one or more resonant capacitors 208a, 208b. The load 210 can include, without limitation, a battery, a display, a wireless communications module, a processor, a memory, a sensor, a user identity module, a voltage filter, a voltage regulator, and other circuit elements configured to receive current (or power or voltage) from the receiver.

The receive coil 206 may be flat or planar. The receive coil 206 is positioned adjacent to, and aligned with, the electric shielding layer 204. In some embodiments the receive coil 206 may be configured to mate to or interface with a concave surface, a convex surface, or an arbitrarily-shaped surface.

In some embodiments, the receive coil 206 may be a wire forming a circular spiral from an outer radius loop to an inner radius loop, with a first electrode connecting to external circuitry at the outer radius loop and a second electrode connecting to external circuitry at the inner radius loop. In other embodiments, the coil 206 may be configured as spirals in a concentric diamond pattern.

The loops of the receive coil 206 may lie in a single layer or in multiple layers. In still other embodiments, the receive coil 206 may be configured as a helical coil, which may be positioned near the electric shielding layer 204 to inductively couple with a wireless transmitter external to the electronic device 200. In some embodiments, the receive coil 206 may have a center tap electrode. Other shapes and configurations for the receive coil 206 may be used.

The one or more resonant capacitors 208a, 208b operate as part of a tank circuit driven by magnetic flux induced in the receive coil 206 produced by an external wireless transmitter. The capacitances of the resonant capacitors 208a, 208b can be based on the frequency used by the wireless transmitter, size constraints, power requirements for the electronic device 200, and so on.

As noted above, the receive coil 206 can capacitively couple to electrical conductors nearby, such as the electric shielding layer 204. Example capacitive couplings are identified in the figure as the stray capacitances 204a, 204b. The stray capacitances 204a, 204b can induce unwanted noise, such as common mode noise, in the electronic device 200, effecting the operation of the load 210 or other circuits within the electronic device 200.

The embodiment shown in FIG. 2 depicts an example configuration of additional components operable to reduce such noise in the electronic device 200. First, a grounding resistor 212 connects the electric shielding layer 204 to a common ground 214 of the electronic device 200. In one embodiment the grounding resistor 212 may be implemented as a separate resistor connected between the shield and a common ground rail or conductor. In another embodiment, the grounding resistor 212 may be implemented as a first section of the electric shielding layer 204 that has a relatively high resistance compared to the remaining section of the shield. Such a first section of the shield can then be connected directly to the common ground 214.

The electronic device 200 also includes a noise-reduction capacitor 216 that is connected from the circuitry of the wireless power receiving system to the electric shielding layer 204. While FIG. 2 shows the noise-reduction capacitor 216, the grounding resistor 212, and the electric shielding layer 204 joined at a circuit node 218, it is understood that the noise-reduction capacitor 216 and the grounding resistor 212 can be connected to the electric shielding layer 204 at a variety of suitable locations relative to leads or electrodes of the receive coil 206 or the one or more resonant capacitors 208a, 208b.

The noise-reduction capacitor 216 has a small capacitance relative to the resonant capacitors 208a, 208b. As a result, the noise-reduction capacitor 216 charges and discharges quickly relative to the resonant frequency of the resonant capacitors 208a, 208b. In this manner, the noise-reduction capacitor 216 can supplement voltage or current through the receive coil 206 should that current or voltage unexpectedly or quickly drop as a result of charge accumulating on the electric shielding layer 204. Further, the grounding resistor 212 provides a path for charge accumulated in the electric shielding layer 204 to return to the common ground of the electronic device. In this manner, the noise-reduction capacitor 216 and the grounding resistor 212 can together function as a low-pass filter.

In the illustrated embodiment, the noise-reduction capacitor 216 is connected to the wireless power receiving system at a circuit node 218 between the receive coil 206 and a resonant capacitor 208b. This can occur in embodiments in which the noise-reduction capacitor 216 is connected at an electrode of an inner coil of the receive coil 206. In such embodiments, for example when the receive coil 206 has concentric loops winding from outer loops to inner loops, there can be a parasitic (stray) capacitance between the outer loops and the electric shielding layer 204 that is larger than the stray capacitances 204a, 204b between the inner loops and the shield. Connecting the noise-reduction capacitor 216 between the shield and an inner coil can balance the stray capacitances 204a, 204b.

While the embodiment shown in FIG. 2 shows just one noise-reduction capacitor, labeled as the noise-reduction capacitor 216, the noise-reduction capacitor 216 may be implemented as more than one distinct circuit elements connected in a circuit. Similarly, the grounding resistor 212 may be implemented as multiple distinct grounding resistors. Further, while FIG. 2 shows two resonant capacitors 208a, 208b, the wireless power receiving system could include other circuit elements located at the positions of the resonant capacitors 208a, 208b.

Figure 3:
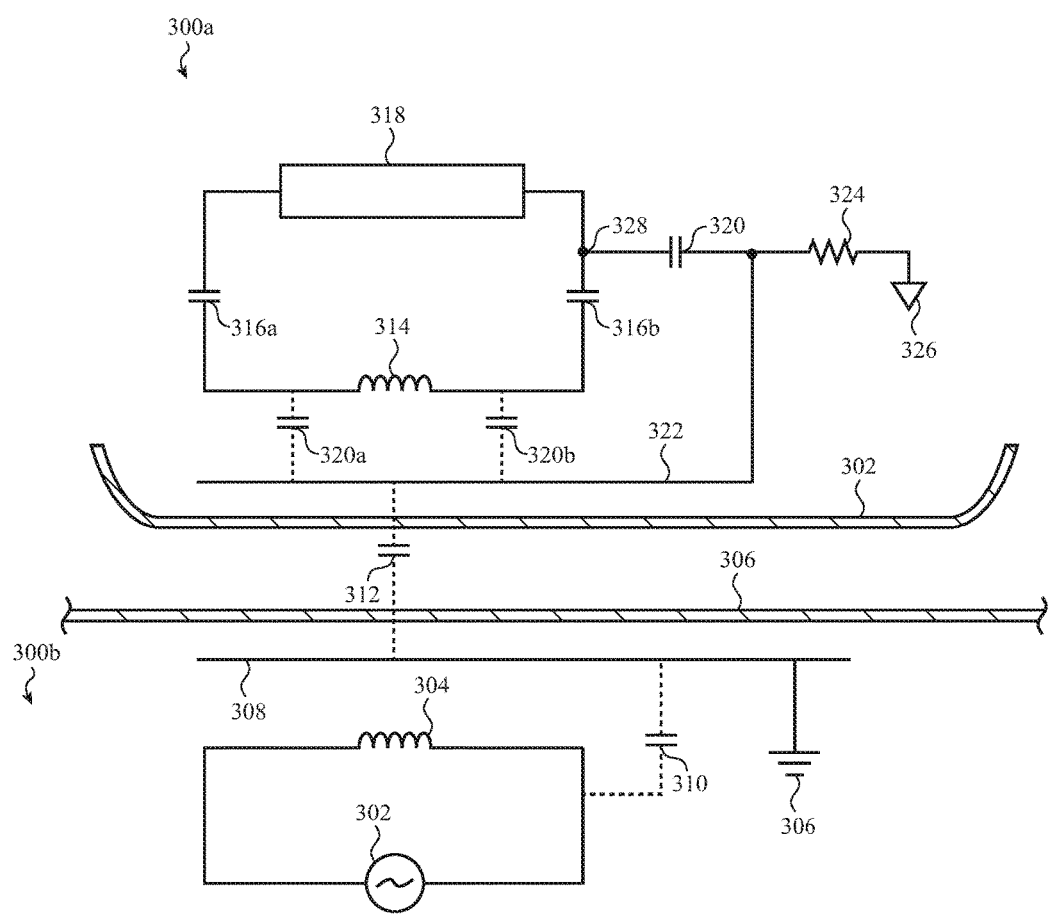
FIG. 3 illustrates a partial cross section and a simplified circuit diagram of a wireless power transfer system, such as described herein.

FIG. 3 shows simplified circuit diagrams and partial cross sectional views of a wireless power transfer system including a transmitter 300a and a receiver 300b. The transmitter 300a includes an alternating current source 302 coupled to a transmit coil 304. The alternating current source 302 may be a voltage source or current source.

The transmitter 300a has a housing or enclosure that defines an exterior surface 306 that is shown in part. The exterior surface 306 may be a flexible, rigid, or semi-rigid material. For example, the exterior surface 306 may be integrated into another device or component, such as but not limited to a separate electronic device, a vehicle console, or a table top.

The alternating current source 302 may be connected to an external power source, such as mains voltage. The transmitter 300a also includes a ground 306, which may be a circuit or earth ground.

A transmit-side electric shielding layer 308 may also be included. The transmit-side electric shielding layer 308 can be connected to the ground 306. The transmit-side electric shielding layer 308 can prevent external electric fields from interfering with the electrical circuit elements of the transmitter 300a. The transmit-side electric shielding layer 308 may completely enclose the transmitter, or only a partial section of the exterior surface 306 of the transmitter 300a.

The transmit coil 304 may be configured as a flat coil, as concentric spirals wound in one or more levels, as helixes, and so on. The transmit coil 304 may be configured to interface with a curved surface, such as a concave or convex surface. The transmitter 300a may include multiple transmit coils, which may be configured in separate layers.

The transmit-side electric shielding layer 308 may be positioned between the transmit coil 304 (or other transmit coils) and the exterior surface 306. In embodiments having multiple transmit coils, the transmit-side electric shielding layer 308 may have multiple sections or segments, each section positioned between a respective transmit coil and the exterior surface 306, and each connected to the ground 306.

The transmit-side electric shielding layer 308 may be made from a conductive but non-ferromagnetic material, such as a paramagnetic metal or alloy. The transmit-side electric shielding layer 308 may be configured with multiple holes, slots, cutouts to reduce eddy current losses.

As noted above, the transmit-side electric shielding layer 308 may accumulate charge which, in turn, can attract or repel charges in nearby conductors. This phenomenon, as noted with respect to other embodiments described herein, can be modeled as a capacitance 310 between the transmit-side electric shielding layer 308 and circuit components within the transmitter 300a and, additionally, can be modeled as a capacitance 312 between the transmit-side electric shielding layer 308 and another nearby conductor.

As noted above, stray capacitances, such as the capacitance 310 and the capacitance 312 can capacitively couple the transmitter 300a with other conductors nearby, such as the receiver 300b.

FIG. 3 also shows certain circuit elements of a receiver 300b, which—as noted above—may be associated with an electronic device. As with other embodiments described herein, the receiver 300b includes a receive coil 314 and resonant capacitors 316a, 316b. Together these operate as a tank circuit configured to magnetically couple to the transmit coil 304. The receive coil 314 is also connected to a load 318, which can include circuitry for charging a battery or circuitry to supply power for operation of an electronic device incorporating the receiver 300b.

A noise-reduction capacitor 320 may be connected between the power receiver and a receive-side electric shielding layer 322. Also, a grounding resistor 324 connects the receive-side electric shielding layer 322 and a common ground 326 to allow a path for noise-induced charge on the receive-side electric shielding layer 322 to return to the common ground 326. In some embodiments, the grounding resistor 324 can be implemented as a section of the receive-side electric shielding layer device 304 having a specific resistance. In other cases, the grounding resistor 324 may be a physical component.

In the embodiment shown, the noise-reduction capacitor 320 connects at a circuit node 328, between the resonant capacitor 308b and the load 318. As will be described below, in other embodiments, the circuit node 328 may be positioned elsewhere.

Figure 4:
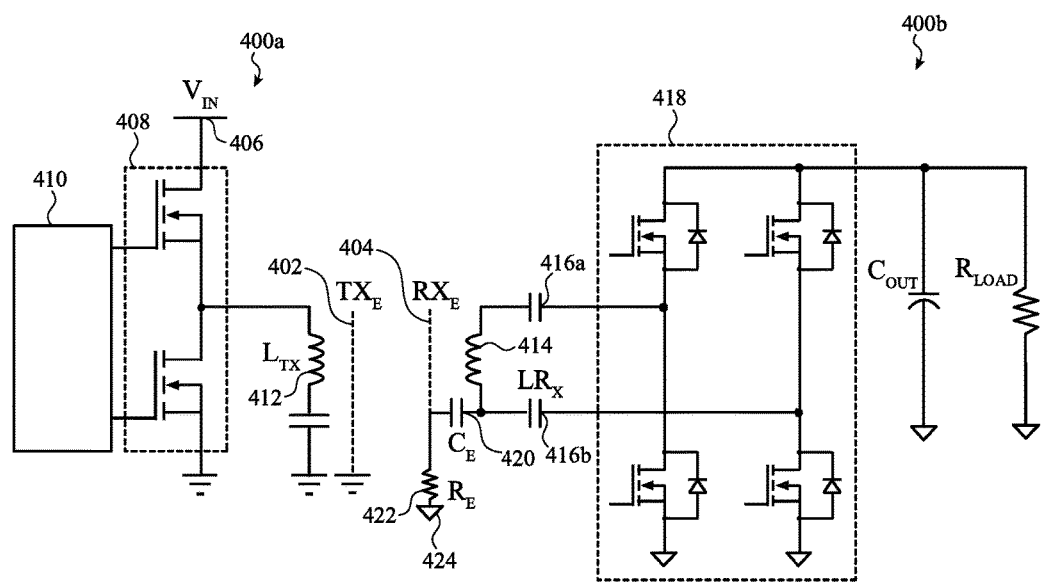
FIG. 4 illustrates a simplified circuit diagram of a wireless power transfer system including a transmit-side electric shielding layer and a receive-side electric shielding layer, such as described herein.

FIG. 4 illustrates a simplified circuit diagram of a wireless power transfer system including a transmitter 400a having a transmit-side electric shielding layer 402 and receiver 400b having a receive-side electric shielding layer 404. The transmitter 400a system includes a power source 406, providing an input voltage $V_{IN}$. The power source 406 is connected to an inverter 408. The inverter 408 is connected to, and controlled by, a controller 410. The duty cycle and frequency of an inverting waveform output from the inverter 408 is controlled by the controller 410. The output of the inverter 408 is coupled to a transmit coil 412.

As noted above, the receiver 400b includes a receive-side electric shielding layer 404. The receiver 400b also includes a receive coil 414 that magnetically couples to the transmit coil 412. Output leads or electrodes of the receive coil 414 can be connected to one or more resonant capacitors, shown as the pair of resonant capacitors 416a, 416b. Though two resonant capacitors are shown, in some embodiments only one resonant capacitor may be included, while other embodiments may include more than two. In some embodiments the resonant capacitors 416a, 416b are located on opposing sides of the receive coil 414. The receive coil 414 can be coupled to a bridge rectifier 418 that provides direct current to a load.

As noted with respect to other embodiments described herein, the receive-side electric shielding layer 404 can capacitively couple to the transmit-side electric shielding layer 402, which, in turn, can introduce noise into the receiver 400b. To compensate, the receiver 400b also includes the noise-reduction capacitor 420—which may be a fixed or variable capacitance—that couples the receive-side electric shielding layer 404 to a lead or electrode of the receive coil 414. The receiver 400b also includes a grounding resistor 422 that couples the receive-side electric shielding layer 404 to a receive-side ground 424.

Figure 5:
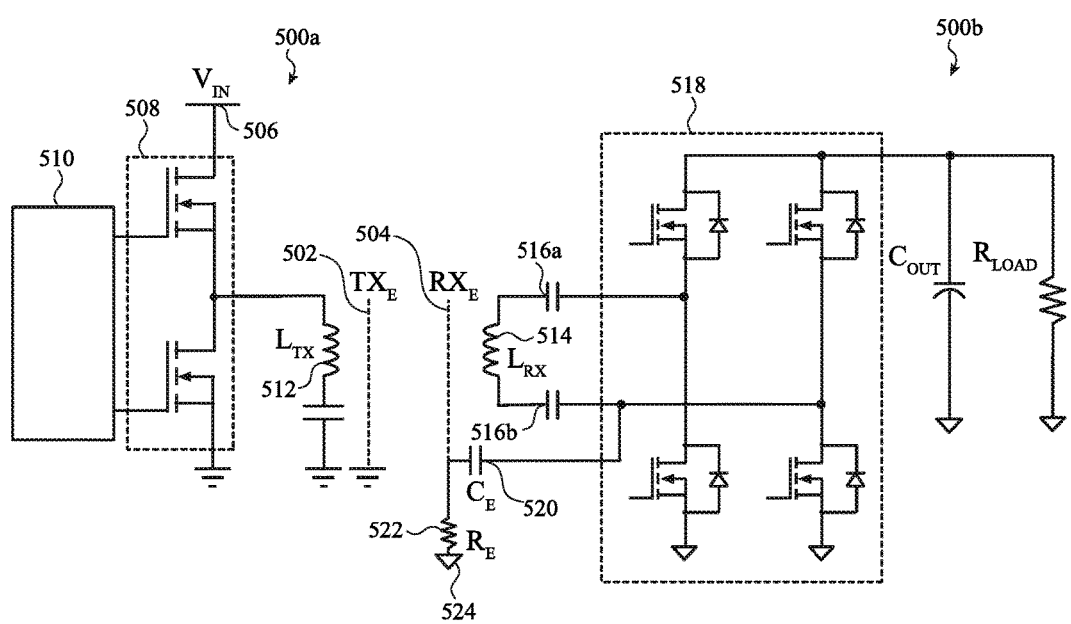
FIG. 5 illustrates another simplified circuit diagram of a wireless power transfer system including a transmit-side electric shielding layer and a receive-side electric shielding layer, such as described herein.

In other cases, a noise-reduction capacitor can be coupled in another manner. For example, FIG. 5 illustrates a simplified circuit diagram of a wireless power transfer system including a transmitter 500a having a transmit-side electric shielding layer 502 and receiver 500b having a receive-side electric shielding layer 504. As with the embodiment depicted above with reference to FIG. 4, the transmitter 500a system is coupled to a power source 506. The power source 506 is connected to an inverter 508. The inverter 508 is connected to, and controlled by, a controller 510. The duty cycle and frequency of an inverting waveform output from the inverter 508 is controlled by the controller 510. The output of the inverter 508 is coupled to a transmit coil 512.

Similar to the embodiment depicted in FIG. 4, the receiver 500b includes a receive-side electric shielding layer 504, a receive coil 514, and one or more resonant capacitors, shown as the pair of resonant capacitors 516a, 516b. The receive coil 514 can be coupled to a bridge rectifier 518 that provides direct current to a load. As noted with respect to other embodiments described herein, the receive-side electric shielding layer 504 can capacitively couple to the transmit-side electric shielding layer 502, which, in turn, can introduce noise into the receiver 500b. To compensate, the receiver 500b also includes the noise-reduction capacitor 520—which may be a fixed or variable capacitance—that couples the receive-side electric shielding layer 504 to a lead or electrode of the resonant capacitor 516b. The receiver 500b also includes a grounding resistor 522 that couples the receive-side electric shielding layer 504 to a receive-side ground 524.

The foregoing embodiments depicted in FIGS. 4-5 and the various alternatives thereof and variations thereto are presented, generally, for purposes of explanation, and to facilitate an understanding of various possible electronic devices or accessory devices that can incorporate, or be otherwise associated with, a wireless power transfer system (incorporating transmit-side and/or receive-side electric shielding layers), such as described herein. However, it will be apparent to one skilled in the art that some of the specific details presented herein may not be required in order to practice a particular described embodiment, or an equivalent thereof.

For example, in some embodiments, more than one transmit coil may share a single transmit-side electric shielding layer. In some cases, a first transmit-side electric shielding layer may be configured or positioned differently from a second transmit-side electric shielding layer. For example, the first transmit-side electric shielding layer may be made from a first material or in a first shape whereas the second transmit-side electric shielding layer is made from a second material or in a second shape. In some cases, a transmitter may include multiple layers of transmit coils; in these embodiments, an upper layer of transmit coils may include one or more transmit-side electric shielding layers, whereas a lower layer of transmit coils does not. In this embodiment, the transmit-side electric shielding layer positioned above the upper layer serves to shield the lower layer as well. In still further cases, a first receiver device may be configured to deliver power to a second receiver device. In these embodiments, the first receiver device may include a transmitter coil and a transmit-side electric shielding layer. In other cases, the first receiver device may include a transmit-side electric shielding layer in addition to a receive-side electric shielding layer. In these embodiments, the receive-side electric shielding layer may be positioned opposite from the transmit-side electric shielding layer.

Further, in some embodiments, more than one receive coil may share a single receive-side electric shielding layer. In these examples, a first receive-side electric shielding layer can be associated with a high-power receive coil and a second receive-side electric shielding layer can be associated with a low-power receive coil.

In other cases, a receive-side electric shielding layer may be optionally or controllably coupled to an electrode or lead of a receive coil and/or to an electrode or lead of a resonant capacitor. More specifically, in one embodiment, more than one noise-reduction capacitors can be coupled—at different locations—between a receive-side electric shielding layer and a receive coil and a resonant capacitor associated with that receive coil. Each of the noise-reduction capacitors may be associated with a voltage-controlled switch (e.g., MOS-FET) that selectively enables or disables the respective noise-reduction capacitor. In these cases, a particular noise-reduction capacitor may be selected by the receiver device based upon one or more characteristics of power transfer. For example, if high power is required by the receiver device, a first noise-reduction capacitor may be selected whereas if low power is required by the receiver device, a second noise-reduction capacitor may be selected. In some examples, a noise-reduction capacitor and/or a grounding resistor may be a variable. Values of the capacitors and/or resistors may be changed to increase the efficiency and/or noise-rejection ability of the receiver device.

Figure 6:
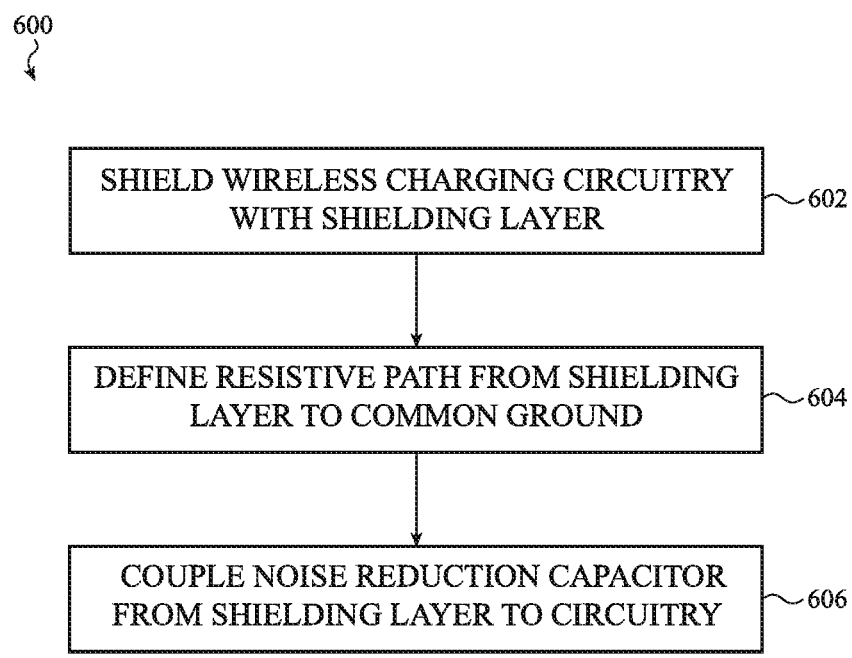
FIG. 6 is a simplified flow chart depicting example operations of a method of reducing noise in a receiver of an electronic device.

FIG. 6 shows a flow chart of a method 600 for reducing noise in an electronic device that uses wireless power recharging. The electronic device has wireless charging circuitry for receiving by coupled induction wireless power transmitted from a separate device. The receiving circuit elements of the electronic device include a receive coil and a resonant capacitor. The receive coil and the resonant capacitor are connected in series with other circuitry that forms a load.

Operation 602 of method 600 includes shielding the wireless charging circuitry with an electric shielding layer. The electric shielding layer may be a conductive material, configured with holes and/or slots to prevent eddy currents and/or pass the magnetic field used for the wireless power transmission. The method may include positioning the electric shielding layer between the wireless charging circuitry and an outer surface or housing of the electronic device. The electric shielding layer may fully enclose the wireless charging circuitry, or only partially enclose the wireless charging circuitry.

Operation 604 of method 600 includes providing a resistive path from the electric shielding layer to a common ground of the electronic device. The resistance of the resistive path may be implemented as a distinct resistor, as a resistive trace on a circuit board, or as a thin connecting part of the electric shielding layer having the desired resistance. The resistive path can allow noise induced voltage or charge on the electric shielding layer to return to the common ground.

Operation 606 of method 600 includes coupling a noise-reduction capacitor from the electric shielding layer to the wireless charging circuitry. The connection with the wireless charging circuitry can be made at a circuit junction or node between the receive coil and the resonant capacitor, or at a circuit junction or node between the resonant capacitor and the load. The capacitance of the noise-reduction capacitor may be selected to be less than the capacitance of the resonant capacitor.

Figure 7:
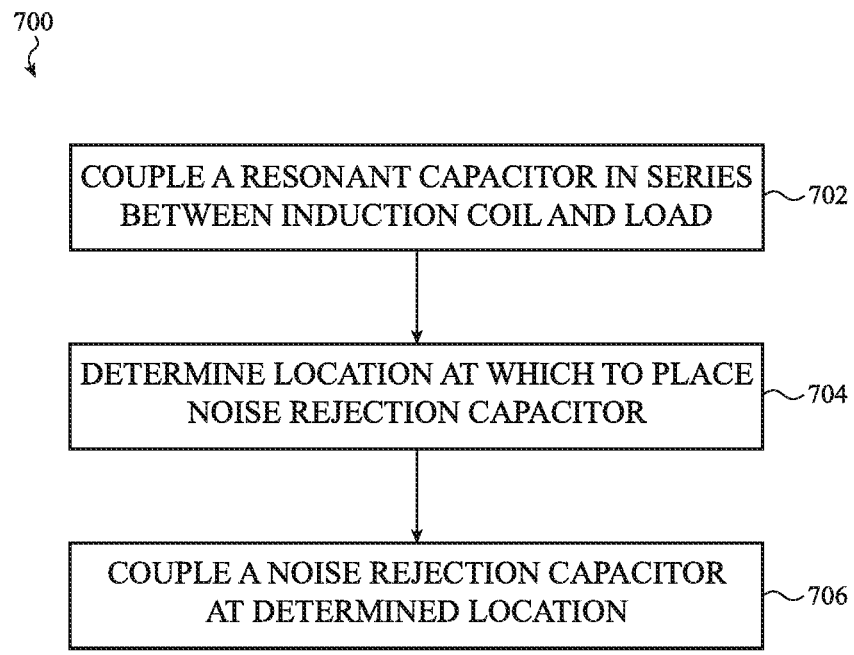
FIG. 7 is a simplified flow chart depicting example operations of another method of reducing noise in a receiver in an electronic device.

FIG. 7 is a flow chart of another method 700 for reducing noise in an electronic device that uses wireless power recharging. The electronic device has wireless charging circuitry for receiving wireless power transmitted from a separate device by inductive coupling. The wireless charging circuitry of the electronic device can include a receive coil, load circuitry, and an electric shielding layer at least partially enclosing the wireless charging circuitry.

At operation 702, the method 700 couples a resonant capacitor in series between the receive coil and the load. The inductance of the receive coil and the capacitance of the resonant capacitor may by selected according to the frequency used by the separate device for wireless power transmission.

Operation 704 includes determining a location at which to connect a noise-reduction capacitor to the wireless charging circuitry. A first potential location is at a circuit node between the receive coil and the resonant capacitor. A second potential location is at a circuit node between the resonant capacitor and the load. Still other locations can be used and may depend upon one or more charging or power transfer characteristics. For example, a first electronic device or receiver may be receive power more efficiently if a noise-reduction capacitor is coupled to a lead of a receive coil whereas a second electronic device or receiver may receive power more efficiently if a noise-reduction capacitor is coupled to a lead of a resonant capacitor. The determination can be made based on which location provides optimal rejection of noise on the electric shielding layer, on ease of manufacture, on which location balances stray capacitances between the receive coil and the electric shielding layer, and/or other considerations.

At operation 706 the method includes connecting the noise-reduction capacitor from the determined location to the electric shielding layer. The noise-reduction capacitor can be selected to have a capacitance less than that of the resonant capacitor. The noise-reduction capacitor can be a variable capacitor, and the method can include adapting its capacitance according to a detected noise level.

Figure 8:
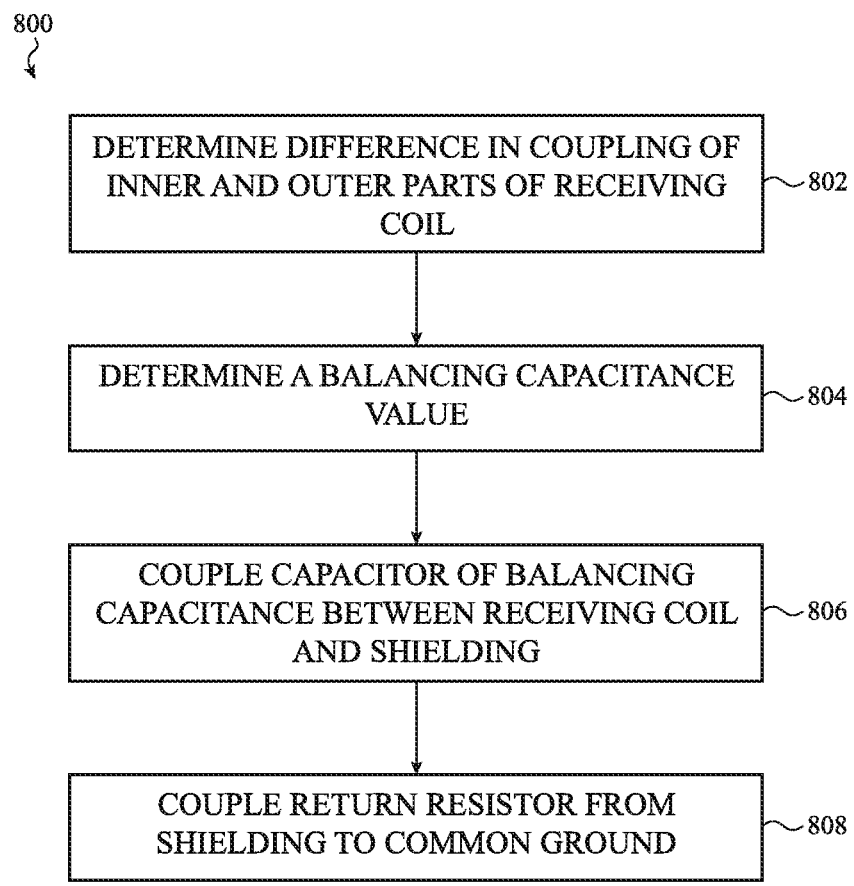
FIG. 8 is a simplified flow chart depicting example operations of another method of reducing noise in a receiver in an electronic device.

FIG. 8 is a flow chart of an additional and/or alternative method 800 for reducing noise in an electronic device that uses wireless power recharging. The electronic device has wireless charging circuitry for receiving wireless power transmitted from a separate device by inductive coupling. The wireless charging circuitry of the electronic device can include an inductive receiving coil and an electric shielding layer at least partially enclosing the wireless charging circuitry. The inductive receiving coil may be configured as a set of concentric loops, with an inner set of loops and an outer set of loops. In operation there may be a capacitive coupling between the inner loops and the outer loops. Further, there can exist differences in stray capacitances between the inner loops and the electric shielding layer and between the outer loops and the electric shielding layer.

Operation 802 of the method 800 includes determining the coupling between the inner loops and the outer loops. Also, determining the stray capacitance may also be performed. The determinations can be made at calibration of the device or during design.

Operation 804 includes determining a capacitance value to be used to balance the coupling. As this determined capacitance may be made at calibration or design, and as circuit elements may drift either over time or in use, the capacitance value for balancing the coupling can be implemented with a variable capacitor. This can allow for updating its capacitance value during use of the device.

At operation 806, the method 800 couples a noise-reduction capacitor having the determined balance capacitance from a circuit junction in the wireless charging circuitry to the electric shielding layer. Stage 808 of the method includes coupling a return resistor from the electric shielding layer to the common ground. The noise-reduction capacitor's capacitance and the resistance of the return resistor may be adapted to filter high frequency noise in the wireless charging circuitry.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. An electronic device, comprising:
a housing;
a receive coil comprising an electrode;
an electric shielding layer disposed between the receive coil and the housing;
a noise-reduction capacitor coupled to the electrode at a circuit node and coupled to the electric shielding layer; and
a grounding resistor connecting the electric shielding layer to a common ground.

2. The electronic device of claim 1, wherein:
the receive coil comprises a plurality of concentric loops; and
the electrode is attached to an inner loop.

3. The electronic device of claim 2, wherein:
a capacitance of the noise-reduction capacitor balances a first capacitance and a second capacitance;
wherein the first capacitance is between inner loops of the receive coil and the electric shielding layer; and
wherein the second capacitance is between outer loops of the receive coil and the electric shielding layer.

4. The electronic device of claim 1, further comprising:
a resonant capacitor connected in series between the electrode and a load,
wherein the circuit node couples the electrode to the resonant capacitor.

5. The electronic device of claim 4, wherein the noise-reduction capacitor has a capacitance that is less than a capacitance of the resonant capacitor.

6. The electronic device of claim 1, further comprising:
a resonant capacitor connected in series between the electrode and a load;
wherein the circuit node couples the resonant capacitor to the load.

7. The electronic device of claim 1, wherein the noise-reduction capacitor is a variable capacitor operative to provide dynamic noise cancellation.

8. The electronic device of claim 7, wherein a capacitance of the noise-reduction capacitor is varied to account for a relative position of the receive coil with respect to a transmit coil exterior to the electronic device.

9. A method of reducing noise in wireless charging circuitry of an electronic device, the method comprising:
shielding the wireless charging circuitry with an electric shielding layer positioned between the wireless charging circuitry and an exterior surface of the electronic device;
connecting a resistor from the electric shielding layer to a common ground of the electronic device; and
coupling a noise-reduction capacitor in series from an electrode of a receive coil to the electric shielding layer of the electronic device.

10. The method of claim 9, further comprising:
connecting the noise-reduction capacitor between the electric shielding layer and a circuit node of the electronic device.

11. The method of claim 9, further comprising:
connecting the noise-reduction capacitor between the electric shielding layer and an output lead of a resonant capacitor coupled to the receive coil.

12. The method of claim 9, further comprising selecting a capacitance value of the noise-reduction capacitor to equalize a first capacitance and a second capacitance, wherein:
the first capacitance is between outer turns of the receive coil and the electric shielding layer; and
the second capacitance is between inner turns of the receive coil and the electric shielding layer.

13. The method of claim 9, wherein the noise-reduction capacitor is a variable capacitor, and further comprising adapting a capacitance of the noise-reduction capacitor in response to detected noise.

14. A system of wireless transmission of power to an electronic device, comprising:
a power transmitter comprising:
an exterior surface;
a transmit coil; and
a transmit-side electric shielding layer positioned between the exterior surface and the transmit coil; and
a power receiver within the electronic device comprising:
a receive coil comprising a electrode;
a receive-side electric shielding layer positioned between the receive coil and a housing of the electronic device;
a noise-reduction capacitor coupling the electrode to the receive-side electric shielding layer; and
a grounding resistor connected from the receive-side electric shielding layer to a common ground of the electronic device;
wherein:
the noise-reduction capacitor and the grounding resistor are operable to attenuate common mode noise.

15. The system of claim 14, wherein the power receiver further comprises a resonant capacitor connected in series between the electrode and a load, wherein:
the resonant capacitor is connected to the electrode at a circuit node; and the noise-reduction capacitor is connected between the receive-side electric shielding layer and the circuit node.

16. The system of claim 15, wherein the noise-reduction capacitor has a capacitance that is less than a capacitance of the resonant capacitor.

17. The system of claim 14, wherein the power receiver further comprises a resonant capacitor connected in series between the electrode and a load, wherein:
the connection of the resonant capacitor with the load is at a circuit node; and
the noise-reduction capacitor is connected between the receive-side electric shielding layer and the circuit node.

18. The system of claim 14, wherein the receive coil is a planar coil comprising a set of concentric loops, wherein the electrode extends from an inner loop.

19. The system of claim 18, wherein the noise-reduction capacitor has a capacitance that is operable to equalize a capacitive coupling between inner loops of the receive coil and the receive-side electric shielding layer with a capacitive coupling between outer loops of the receive coil and the receive-side electric shielding layer.

20. The system of claim 14, wherein the noise-reduction capacitor has a variable capacitance, and the system adapts the variable capacitance to provide dynamic noise cancellation.

* * * * *